United States Patent [19]

Asano

[11] Patent Number: 5,583,484
[45] Date of Patent: Dec. 10, 1996

[54] LIGHTING CONTROL APPARATUS OF A CONTROL PANEL IN AN AUTOMOBILE

[75] Inventor: Michio Asano, Konan-machi, Japan

[73] Assignee: Zexel Corp., Tokyo, Japan

[21] Appl. No.: 440,713

[22] Filed: May 15, 1995

[30] Foreign Application Priority Data

May 16, 1994 [JP] Japan .................................. 6-126941

[51] Int. Cl.$^6$ ............................................. B60Q 1/00
[52] U.S. Cl. ............................ 340/461; 340/462; 362/23; 315/77
[58] Field of Search .................................. 340/461, 462; 362/23; 315/77

[56] References Cited

U.S. PATENT DOCUMENTS 4,786,843  11/1988  Yamamoto et al. ..................... 340/461

FOREIGN PATENT DOCUMENTS

4-143134  5/1992  Japan .

Primary Examiner—Jeffery Hofsass
Assistant Examiner—Dary L. C. Pope

[57] ABSTRACT

In a lighting control apparatus of a control panel in an automobile, a brightness reduction characteristic of a control panel lighting unit relative to a brightness signal of a brightness control unit is previously set according to external operation. The brightness control unit gives a brightness signal for controlling a luminosity of an instrument panel and a luminosity of a control panel which is provided near the instrument panel to a luminosity corresponding to an operation of a dimmer knob. When the brightness signal is given from the brightness control unit, the brightness of the control panel lighting unit is controlled according to a set brightness reduction characteristic relative to the brightness signal of the brightness control unit. Thereby, it is possible to make the luminosity of the control panel relative to the instrument panel a desired brightness characteristic.

23 Claims, 6 Drawing Sheets

LIGHTING CONTROL APPARATUS OF A CONTROL PANEL IN AN AUTOMOBILE

BACKGROUND OF THE INVENTION

The present invention relates to a lighting control apparatus of a control panel in an automobile, and it can be applied, for example, to a control panel of an automobile air-conditioning system.

The Japanese Patent Laid Open Publication No. 4-143134 discloses an apparatus for controlling a luminosity of a control panel of an air-conditioning system and a radio/stereo set in three steps according to a brightness/darkness outside a car-room. This apparatus has lighting means for lighting the control panel for the air-conditioning system and the radio/stereo set, brightness reduction means for decreasing a luminosity of the lighting means, and brightness reduction control means for controlling the brightness reduction means in three steps according to a luminosity outside the car-room. The brightness reduction means is driven when a light switch is turned on. The brightness control means has a day mode, a night mode and a medium mode to be an intermediate of these two modes. The brightness reduction control means selects one of the day, night and medium modes based on an output of a sun sensor for detecting a quantity of solar radiation, and gives the selected mode to the brightness reduction means. If the selected mode is the day mode, the brightness reduction means does not reduce the luminosity of the lighting means. If the selected mode is the night mode, the brightness reduction means reduces the luminosity of the lighting means to a normal brightness reduction condition. If the selected mode is the medium mode, the brightness reduction means reduces the luminosity of the lighting means to a luminosity between the day and night modes.

According to the above-mentioned prior art, the luminosity of the control panel of the air-conditioning system and the radio/stereo set is merely controlled according to the brightness/darkness outside the car-room. Hence, the prior art cannot set the luminosity of the control panel to a luminosity which a driver wants in conjunction with a luminosity of an instrument panel that provides a speedometer and a tachometer. The luminosity of the control panel of the air-conditioning system and the radio/stereo set varies by a difference between a lighting element of the instrument panel and that of the control panel, and, by a difference of secular change between the instrument panel's lighting element and the control panel's lighting element, in relation to the luminosity of the instrument panel. Since the prior art cannot set the luminosity of the control panel as desired by the driver, when the luminosity of the control panel is too dark/bright relative to the luminosity of the instrument panel, it cannot adjust the luminosity of the control panel brighter/darker.

SUMMARY OF THE INVENTION

It is an object of the present invention to provide an improved lighting control apparatus of a control panel in an automobile.

It is another object of the present invention to provide a lighting control apparatus which is capable of setting a luminosity of a control panel to a luminosity a driver wants.

The above and other objects are attained by a lighting control apparatus of a control panel in an automobile comprising: brightness control means, responsive to an operation of a dimmer knob for giving a brightness setting information, for giving a brightness signal for controlling a luminosity of an instrument panel and a luminosity of the control panel which is provided near the instrument panel to a luminosity corresponding to the operation of said dimmer knob; instrument panel lighting means, responsive to said brightness control means, for lighting said instrument panel according to the brightness signal of said brightness control means; control panel lighting means for lighting said control panel; control panel brightness reduction characteristic setting means, responsive to an external operation, for setting a brightness reduction characteristic of said control panel lighting means relative to the brightness signal of said brightness control means; and control panel brightness control means, responsive to said brightness control means and said control panel brightness reduction characteristic setting means, for controlling the brightness of said control panel lighting means according to the brightness signal of said brightness control means and the brightness reduction characteristic set by said control panel brightness reduction characteristic setting means.

According to the present invention, the brightness reduction characteristic of the control panel relative to the brightness signal of the brightness control means is previously set according to an external operation. When brightness control is performed by the brightness control means, the luminosity of the control panel is controlled according to the set brightness reduction characteristic. As the brightness reduction characteristic can be set relative to the external operation, it is possible to make the luminosity of the control panel a luminosity the driver wants. Moreover, even when the luminosity of the control panel varies due to a difference between lighting elements of the instrument panel and the control panel and a difference in secular change thereof, it is possible to reset the luminosity of the control panel relative to the instrument panel.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE INVENTION

Figure 1:
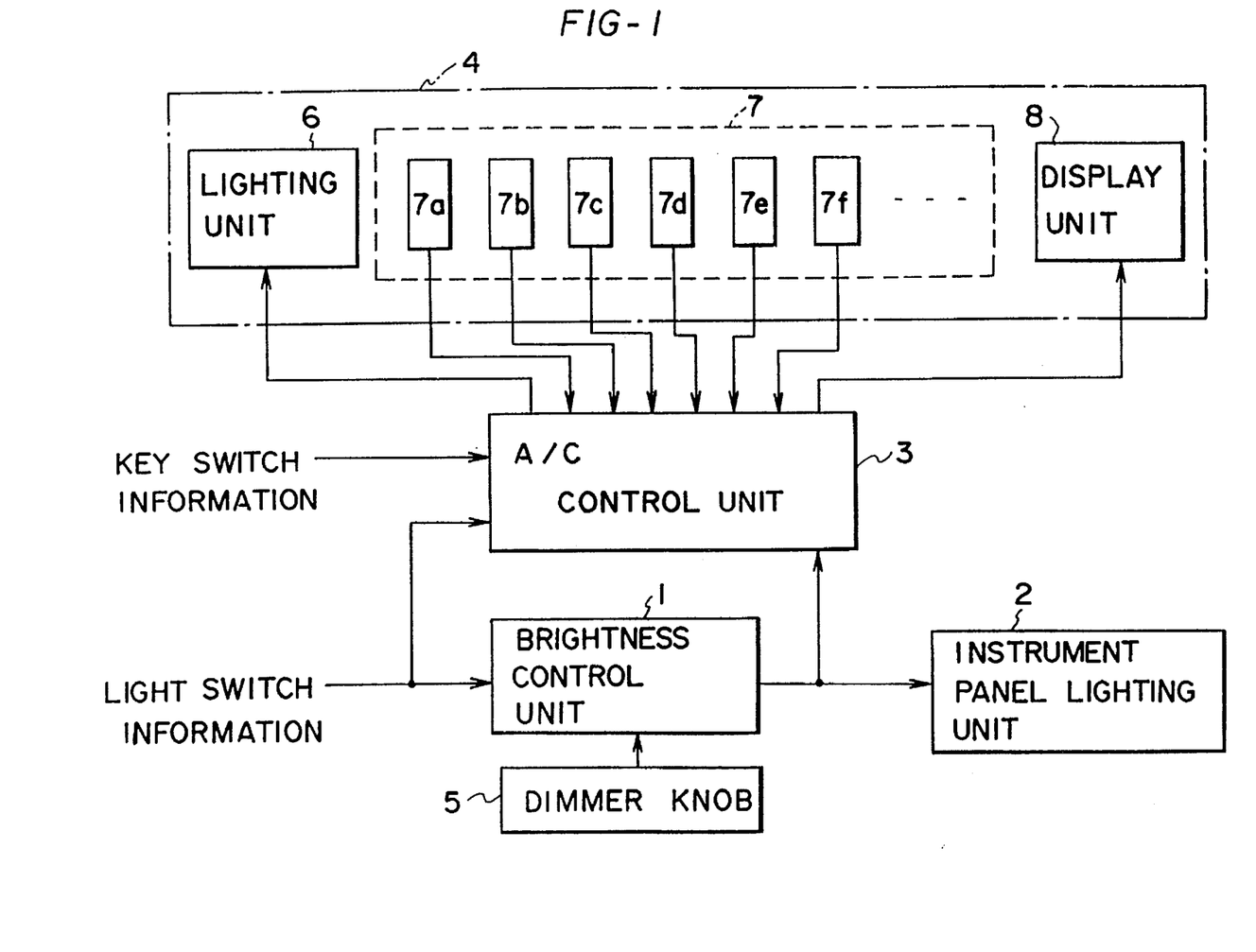
FIG. 1 is a block diagram showing an embodiment of the present invention.
Figure 7:
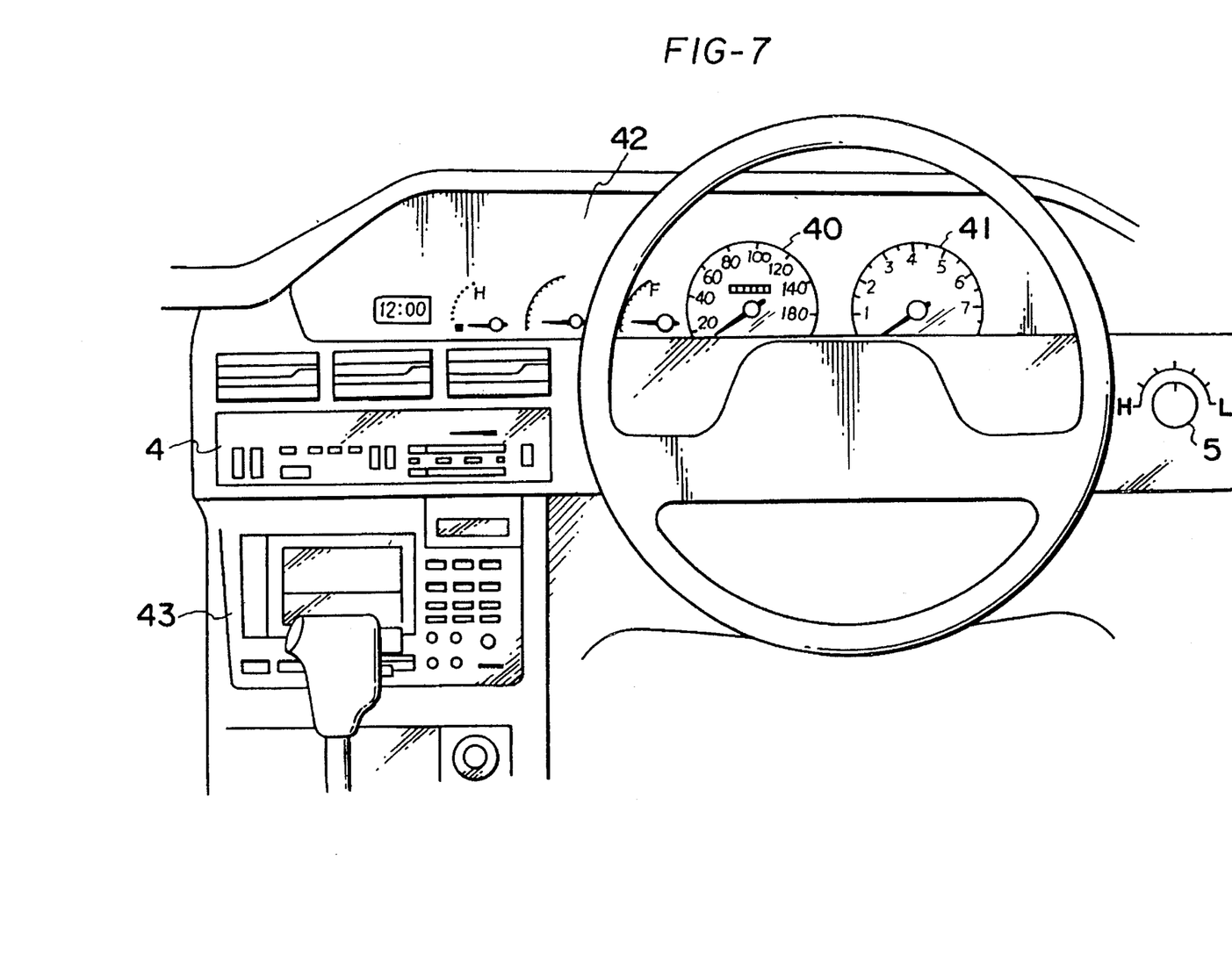
FIG. 7 is a drawing showing an instrument panel of an automobile.

In FIG. 1, a reference numeral 1 is a brightness control unit, a reference numeral 2 is an instrument panel lighting unit, a reference numeral 3 is a control unit of an air-conditioning system, and a reference numeral 4 is a control panel of the air-conditioning system. The instrument panel lighting unit 2 lights an instrument panel 42 which has meters including a speedometer 40 and a tachometer 41 as shown in FIG. 7. The control panel 4 of the air-conditioning system is provided near the instrument panel 42, as shown in FIG. 7. In FIG. 7, a reference numeral 43 is a control panel of a radio/stereo set. The brightness control unit 1 inputs a light switch information of an automobile. The light switch information gives an ON information when a small light and/or a head light of the automobile is turned on. The brightness control unit 1, when the light switch information is ON, gives a brightness signal relative to an operational position of a dimmer knob 5 to the instrument panel lighting unit 2 and the control unit 3 of the air-conditioning system. The dimmer knob 5, as shown in FIG. 7, is of a dial type, for example, and gives an optional brightness information, from a minimum brightness to a maximum brightness, to the brightness control unit 1. The instrument panel lighting unit 2 lights the meters of the instrument panel 42 with a luminosity following the brightness signal from the brightness control unit 1. The control panel 4 of the air-conditioning system has a lighting unit 6, an operation unit 7, and a display unit 8 of LCD (Liquid Crystal Display) and so on. The lighting unit 6 lights the operation unit 7 and the display unit 8. The lighting unit 6 is controlled by the control unit 3 that inputs the brightness signal of the brightness control unit 1. The display unit 8 is for displaying temperatures, operational conditions and so on, and is controlled by the control unit 3. The operation unit 7 has an OFF switch 7a which requests stop of air-conditioning, an A/C switch 7b which requests air-conditioning, ECON switch 7c which requests an economical air-conditioning, a temperature setting switch 7d for setting a car-room temperature, an AMB switch 7e which requests display of outdoor temperature, a fan switch 7f for setting a fan wind volume and so on. The operation unit 7, when the switches 7a–7f are operated, gives corresponding signals to the control unit 3. The control unit 3 further inputs a key switch information and a light switch information.

The control unit 3 of the air-conditioning system has the following functions in addition to the well-known air-conditioning control functions. According to flow diagrams of FIG. 3 and FIG. 4, the control unit 3 sets a brightness reduction characteristic of the lighting unit 6 of the control panel 4 relative to the brightness signal from the brightness control unit 1. And, according to a flow diagram of FIG. 5, the control unit 3 controls a luminosity of the lighting unit 6 of the control panel 4 relative to the brightness signal from the brightness control unit 1, using the set brightness reduction characteristic.

Figure 2:
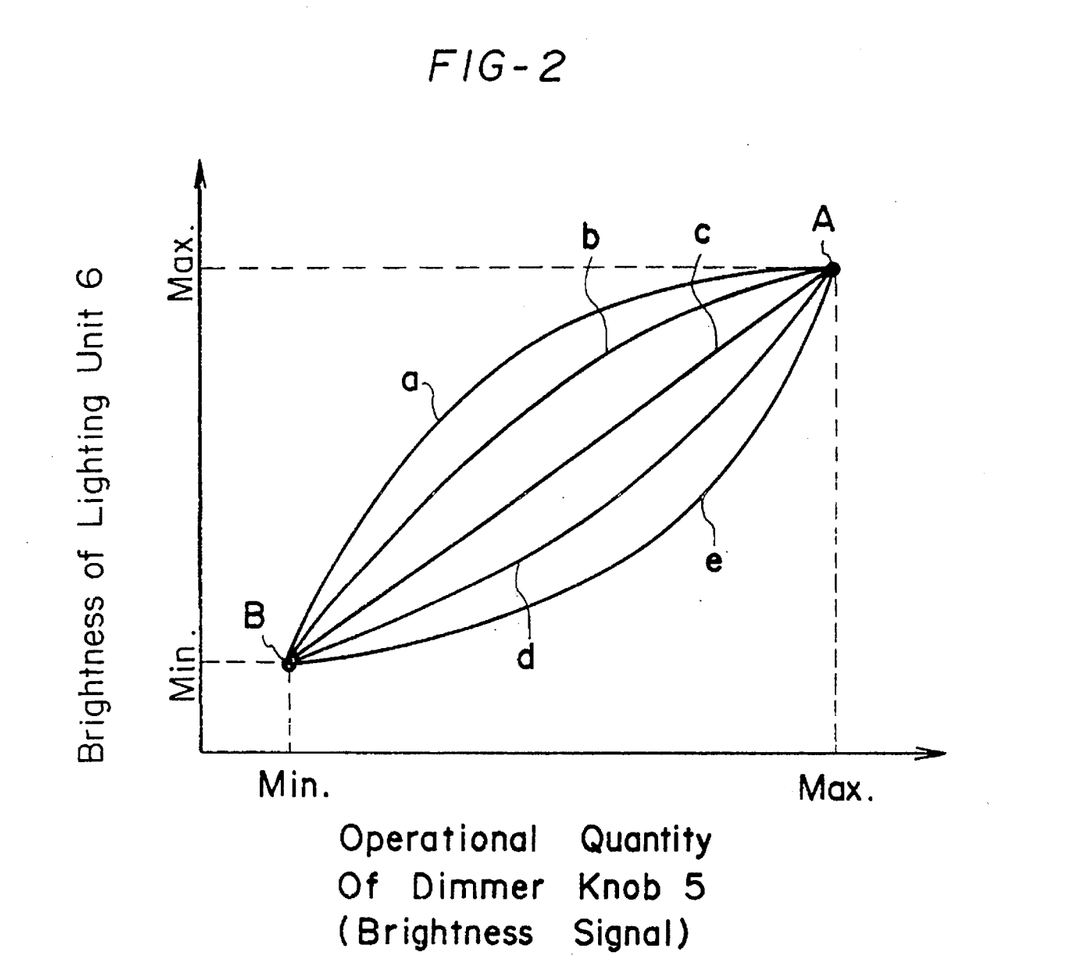
FIG. 2 is an explanatory drawing for explaining a brightness reduction characteristic setting function of a control unit in FIG. 1.

FIG. 2 is an explanatory drawing for explaining a brightness reduction characteristic setting function of the control unit 3. In FIG. 2, a vertical axis shows a brightness of the lighting unit 6 of the control panel 4, and the lateral axis shows an operational quantity of the dimmer knob 5. A reference letter A represents a maximum brightness, a reference letter B a minimum brightness, and reference letters (a) to (e) brightness reduction characteristic curves. The maximum brightness A of the lighting unit 6 of the control panel 4 is set by adjusting the luminosity of the lighting unit 6 to a desired maximum brightness, under a condition the dimmer knob 5 is operated to the maximum brightness. The minimum brightness B is set by adjusting the luminosity of the lighting unit 6 to a desired minimum brightness, under a condition the dimmer knob 5 is operated to the minimum brightness. After the maximum brightness A and the minimum brightness B are set, one of the brightness reduction characteristic curves (a) to (e) is selected. According to the set maximum brightness A and minimum brightness B and the selected brightness reduction characteristic curve, a brightness reduction characteristic of the lighting unit 6 of the control panel 4 is set relative to the operational quantity of the dimmer knob 5. Setting of the maximum brightness A and minimum brightness B, selection of the brightness reduction curves (a) to (e) and setting of the brightness reduction characteristic, as mentioned in the following, are performed by operating the existing switches of the operation unit 7 of the control panel 4.

Figure 3:
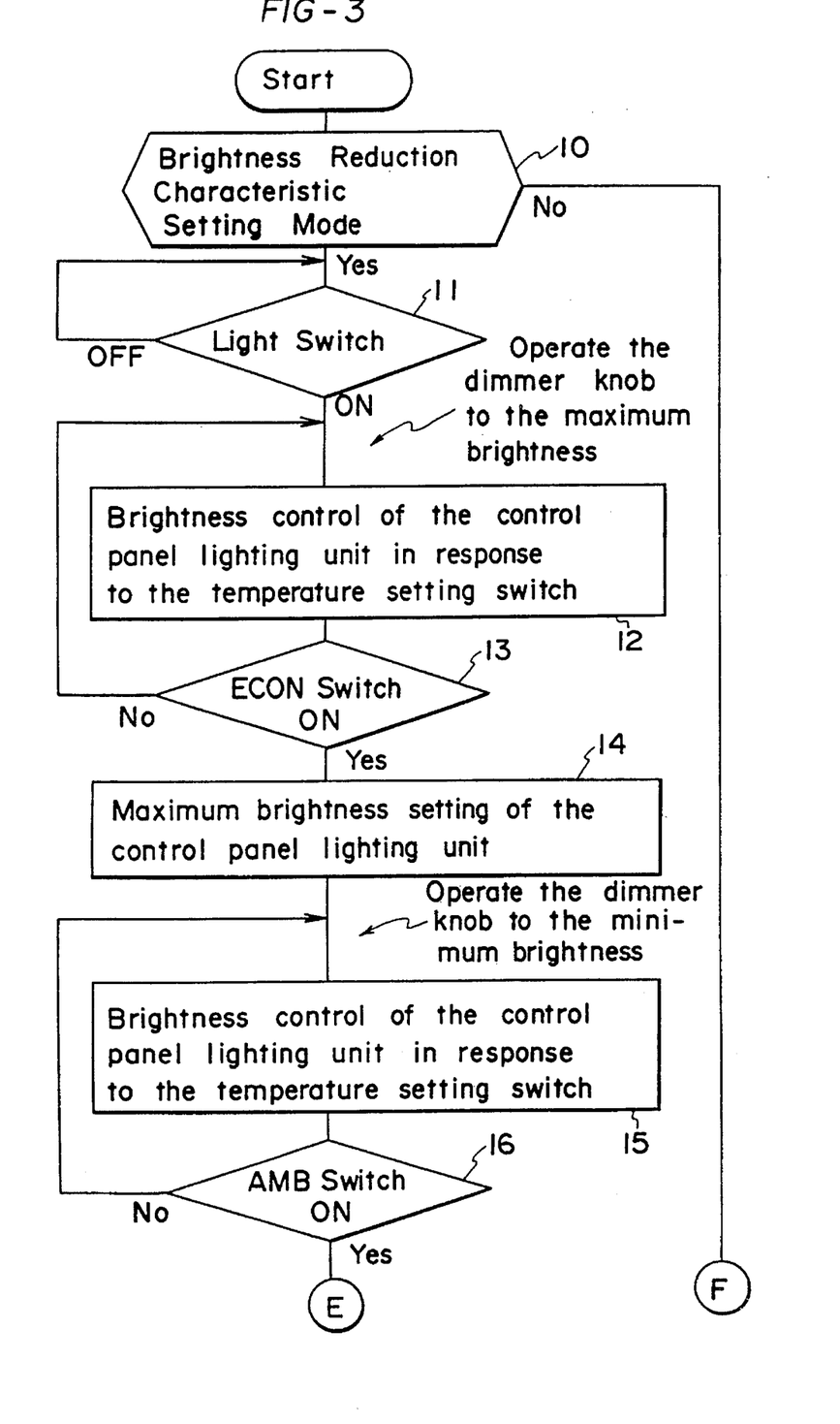
FIG. 3 is a flow diagram of the control unit in FIG. 1 and shows a brightness reduction characteristic setting processing of a control panel.
Figure 4:
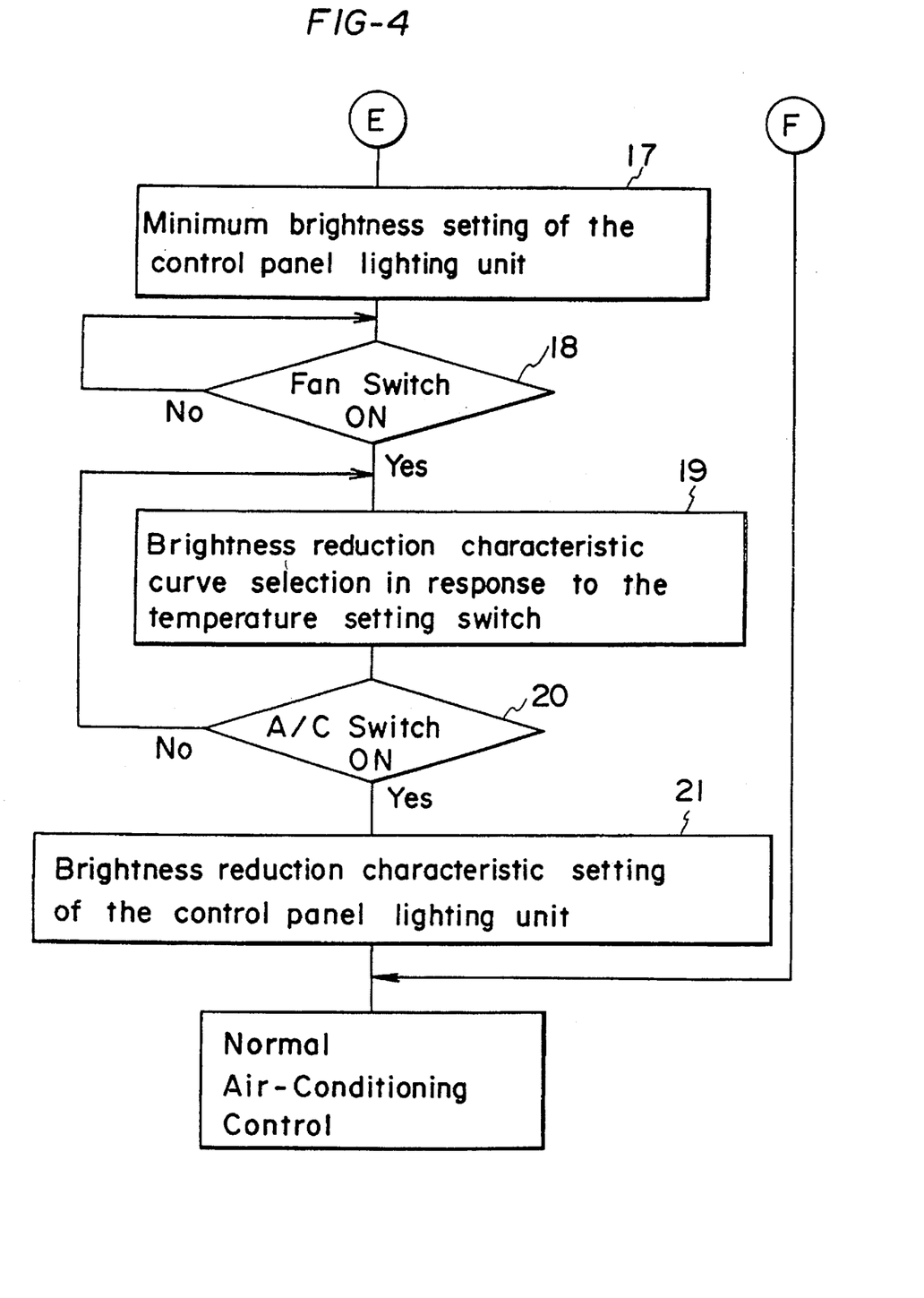
FIG. 4 is a flow diagram of the control unit in FIG. 1, and is connected to the flow diagram of FIG. 3.

FIG. 3 and FIG. 4 are flow diagrams of the control unit 3, showing the processing of setting the brightness reduction characteristic of the control panel 4. Terminals E and F of FIG. 3 are connected with terminals having the same signs E and F of FIG. 4.

The control unit 3 decides in a step 10 whether a brightness reduction characteristic setting mode for setting the brightness reduction characteristic of the lighting unit 6 of the control panel 4 is requested. In this embodiment, if the OFF switch 7a is depressed within 10 seconds after a key switch is turned on, and, if the OFF switch 7a is maintained in this depressed condition for 5 seconds or longer, the control unit 3 recognizes that the brightness reduction characteristic setting mode is requested. The control unit 3, when recognizing the request of the brightness reduction characteristic setting mode in the step 10, enters a step 11, and if not, starts a normal air-conditioning.

In the step 11, whether the light switch is on based on the light switch information is decided. When the light switch is on, setting of the maximum brightness of the lighting unit 6 of steps 12, 13 and 14 is begun. As the light switch is on, the instrument panel 42 and the control panel 4 are lighted by the instrument panel lighting unit 2 and the lighting unit 6. In the step 12, the control unit 3, responding to an operation of the temperature setting switch 7d, controls a luminosity of the lighting unit 6. In the step 13, the control unit 3 decides whether the ECON switch 7c is depressed. In the step 14, the control unit 3, responding to the depressing of the ECON switch 7c, sets the luminosity of the lighting unit 6 as the maximum brightness A. In the steps 12, 13 and 14 as described above, the maximum brightness A of the lighting unit 6 is set through the following operations. First, the dimmer knob 5 is operated to the maximum brightness. Under this condition, the temperature setting switch 7d is operated. In response to the operation of the temperature setting switch 7d, the control unit 3 controls a luminosity of the lighting unit 6. Hence, the temperature setting switch 7d is operated so that a luminosity of the control panel 4 becomes a desired maximum brightness. When the luminosity of the control panel 4 becomes the desired maximum brightness, the ECON switch 7c is operated. Accordingly, the control unit 3 sets the luminosity as the maximum brightness A of the lighting unit 6. The luminosity of the lighting unit 6 by the operation of the temperature setting switch 7d is, for example, controlled such that the luminosity of the lighting unit 6 is increased when the temperature setting switch 7d is operated in a high temperature direction, and decreased when operated in a low temperature direction.

After the maximum brightness A of the lighting unit 6 is set, setting of a minimum brightness B of the lighting unit 6 of steps 15, 16 and 17 is begun. In the step 15, the control unit 3, responding to an operation of the temperature setting switch 7d, controls the luminosity of the lighting unit 6 of the control panel 4. In the step 16, the control unit 3 decides whether the AMB switch 7e is depressed. In the step 17, the control unit 3, responding to the depressing of the AMB switch 7e, sets the luminosity of the lighting unit 6 as the minimum brightness B. In the steps 14, 15 and 16 as described above and through operations described below, the minimum brightness B of the lighting unit 6 is set. First, the dimmer knob 5 is operated to a minimum brightness. Under this condition, the temperature setting switch 7d is operated. In response to the operation of the temperature setting switch 7d, the control unit 3 controls the luminosity of the lighting unit 6. Hence, the temperature switch 7d is operated so that the luminosity of the control panel 4 becomes a desired minimum brightness. When the luminosity of the control panel 4 becomes the desired minimum brightness, the AMB switch 7e is operated. And, by this, the control unit 3 sets the luminosity as the minimum brightness B of the lighting unit 6.

After setting the maximum brightness A and the minimum brightness B of the lighting unit 6, the control unit 3 enters a step 18. In the step 18, whether the fan switch 7f is depressed is decided. When the fan switch 7f is depressed, selection of the brightness reduction characteristic curves (a) to (e) of steps 19 and 20 are begun. In the step 19, the control unit 3, responding to an operation of the temperature setting switch 7d, displays the brightness reduction characteristic curves (a) to (e) one by one on the display unit 8. In the step 20, the control unit 3, responding to an operation of the A/C switch 7b, selects a brightness reduction characteristic curve displayed on the display unit 8. The brightness reduction characteristic curves (a) to (e) may be displayed with signs and numbers, or they may be displayed with the curves as are. When the A/C switch 7b is operated, the control unit 3 enters from the step 20 to a step 21, and according to the set maximum brightness A and the minimum brightness B and the selected brightness reduction characteristic curve, sets a brightness reduction characteristic of the lighting unit 6 of the control panel 4 relative to the operation of the dimmer knob 5. After that, the control unit 3 starts the normal air-conditioning.

Figure 5:
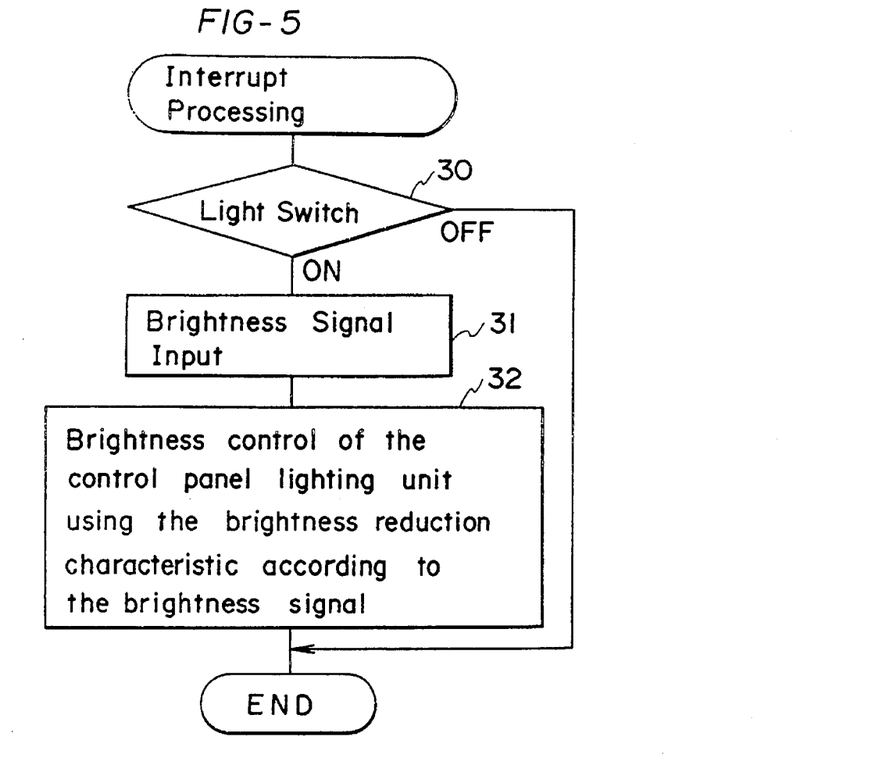
FIG. 5 is a flow diagram of the control unit in FIG. 1 and shows a brightness control processing of the control panel.

FIG. 5 is a flow diagram of the control unit 3, showing a brightness control processing of the control panel 4. The flow diagram of FIG. 5 is processed by interruption that is brought about regularly. When interruption occurs, the control unit 3 decides ON/OFF of the light switch based on the light switch information in a step 30. If the light switch is not ON, the control unit 3 finishes the interruption. If the light switch is ON, the control unit 3 inputs the brightness signal, that is an operational quantity of the dimmer knob 5, from the brightness control unit 1, in a step 31. In a following step 32, the control unit 3, responding to the brightness signal of the brightness control unit 1, controls the luminosity of the control panel 4 according to the set brightness reduction characteristic.

In the embodiment mentioned above, the brightness reduction characteristic of the lighting unit 6 of the control panel 4 is set by the set maximum brightness and minimum brightness, and the selected brightness reduction characteristic curve. Accordingly, in this embodiment, setting operations of the maximum brightness and the minimum brightness and selecting operation of the brightness reduction curve are required. In another embodiment mentioned below, the brightness reduction characteristic of the lighting unit 6 of the control panel 4 can be set only by means of the setting operations of the maximum brightness and the minimum brightness, without necessitating the selecting operation of the brightness reduction characteristic curve.

Figure 6:
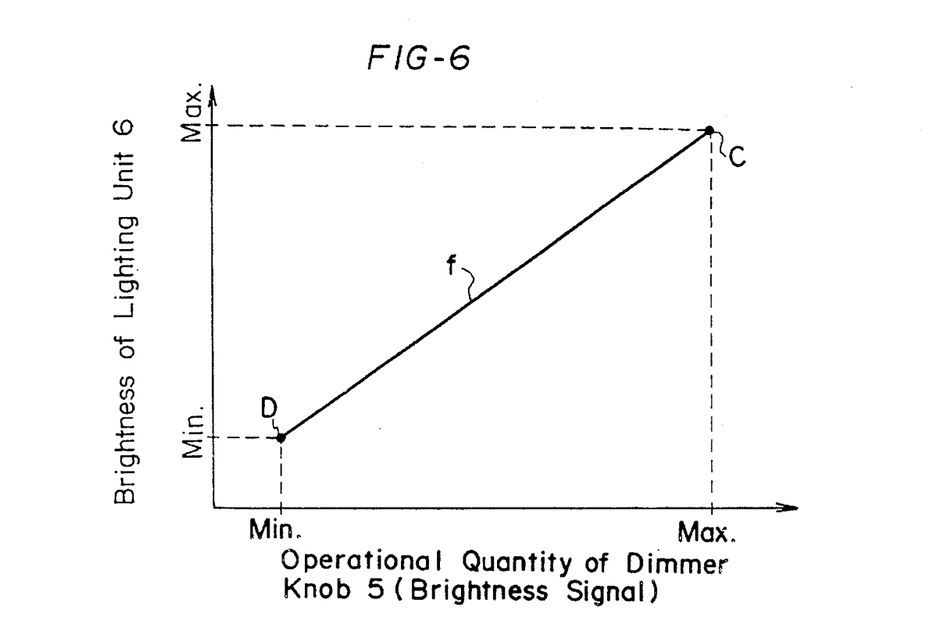
FIG. 6 is an explanatory drawing of a case that the brightness reduction characteristic of the control panel is set only by means of setting a maximum brightness and a minimum brightness.

FIG. 6 is an explanatory drawing of setting a brightness reduction characteristic of the lighting unit 6 of the control panel 4 only by means of the setting operations of a maximum brightness and a minimum brightness. In FIG. 6, a vertical axis shows a brightness of the lighting unit 6 of the control panel 4 and a lateral axis a operational quantity of the dimmer knob 5. A reference letter C is the maximum brightness, a reference letter D the minimum brightness, and a reference letter f the brightness reduction characteristic curve. The brightness reduction characteristic curve f is stored in the control unit 3. The maximum brightness C and the minimum brightness D, as described in the embodiment mentioned above, are set when the luminosity of the lighting unit 6 is adjusted to a desired maximum and minimum brightness with the dimmer knob 5 being operated to the maximum and minimum brightness. After the maximum brightness C and the minimum brightness D are set, the control unit 3, based on the maximum brightness C, the minimum brightness D and the brightness reduction characteristic curve f, sets the brightness reduction characteristic of the lighting unit 6 of the control panel 4 relative to the operational quantity of the dimmer knob 5. Hence, processings in the steps 18, 19 and 20 of the flow diagrams of FIG. 3 and FIG. 4 are not necessary, and thereby both the setting operation and the contents of processing can be simplified.

Of course, the present invention is also applicable to control panels of a radio/stereo set and so on.

According to the present invention, the brightness reduction characteristic of the control panel lighting unit 6 relative to the brightness signal from the brightness control unit 1 is previously set according to an external operation. When the brightness signal is given from the brightness control unit 1, the luminosity of the control panel lighting unit 6 is controlled following the set brightness reduction characteristic. Since the brightness reduction characteristic of the control panel lighting unit 6 can be set according to the external operation, it is possible to make the luminosity of the control panel 4 a luminosity the driver wants. And, even when the luminosity of the control panel 4 varies because of a difference in lighting elements between the instrument panel 42 and the control panel 4 or a difference in their secular changes, it is possible to reset the luminosity of the control panel 4 in conjunction with the instrument panel 42.

From the foregoing it will now be apparent that a new and improved lighting control apparatus of an automobile's control panel has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A lighting control apparatus of a control panel comprising:

brightness control means, responsive to an operation of a dimmer knob for giving a brightness setting information, for giving a brightness signal for controlling a luminosity of an instrument panel and a luminosity of the control panel which is provided near the instrument panel to a luminosity corresponding to the operation of said dimmer knob;

instrument panel lighting means, responsive to said brightness control means, for lighting said instrument panel according to the brightness signal of said brightness control means;

control panel lighting means for lighting said control panel;

control panel brightness reduction characteristic setting means, responsive to an external operation, for setting a brightness reduction characteristic of said control panel lighting means relative to the brightness signal of said brightness control means; and control panel brightness control means, responsive to said brightness control means and said control panel brightness reduction characteristic setting means, for controlling the brightness of said control panel lighting means according to the brightness signal of said brightness control means and the brightness reduction characteristic set by said control panel brightness reduction characteristic setting means.

2. The apparatus as claimed in claim 1, wherein said control panel brightness reduction characteristic setting means includes;

mode decision means, responsive to a first external operation, for deciding whether a brightness reduction characteristic setting mode for setting the brightness reduction characteristic of said control panel lighting means is requested;

light switch decision means, responsive to said mode decision means and a light switch information, for deciding whether a light switch is ON based on said light switch information when said brightness reduction characteristic setting mode is requested;

control means, responsive to said light switch decision means and a second external operation, for controlling the brightness of said control panel lighting means according to the second external operation when the light switch is ON;

maximum brightness setting means, responsive to said control means and a third external operation, for setting a maximum brightness of said control panel lighting means corresponding to the request for a maximum brightness of said brightness control means to an optional luminosity controlled by said control means according to the third external operation;

minimum brightness setting means, responsive to said control means and a fourth external operation, for setting a minimum brightness of said control panel lighting means corresponding to the request for a minimum brightness of said brightness control means to an optional luminosity controlled by said control means according to the fourth external operation; and brightness reduction characteristic setting means, responsive to said maximum brightness setting means and said minimum brightness setting means, for setting the brightness reduction characteristic of said control panel lighting means relative to the brightness signal of said brightness control means based on the maximum brightness and the minimum brightness set by said maximum brightness setting means and said minimum brightness setting means.

3. The apparatus as claimed in claim 2, wherein said control panel is a control panel of an air-conditioning system.

4. The apparatus as claimed in claim 2, wherein said first external operation is an operation of a key switch of the automobile and an operation of a first switch of said control panel, said mode decision means recognizing the request for the brightness reduction characteristic setting mode when the first switch is turned on within a first prescribed time after the key switch is operated from an OFF to an ON, and, when the first switch keeps the ON condition for a second prescribed time.

5. The apparatus as claimed in claim 2, wherein said second external operation is an operation of a second switch of said control panel, said third external operation is an operation of a third switch of said control panel, and said fourth external operation is an operation of a fourth switch of said control panel.

6. The apparatus as claimed in claim 3, wherein said second external operation is an operation of a temperature control switch of said control panel.

7. The apparatus as claimed in claim 2, wherein, in setting the maximum brightness of said control panel by said maximum brightness setting means, said dimmer knob is operated so that a maximum brightness setting information is given to said brightness control means, and wherein, in setting the minimum brightness of said control panel lighting means by said minimum brightness setting means, said dimmer knob is operated so that said dimmer knob gives a minimum brightness setting information to said brightness control means.

8. The apparatus as claimed in claim 2, wherein said brightness reduction characteristic setting means has one brightness reduction characteristic curve representative of a relationship between the brightness signal of said brightness control means and the brightness of said control panel lighting means, and sets the brightness reduction characteristic of said control panel lighting means relative to the brightness signal of said brightness control means based on the maximum brightness set by said maximum brightness setting means, the minimum brightness set by said minimum brightness setting means and said one brightness reduction characteristic curve.

9. The apparatus as claimed in claim 2, wherein said brightness reduction characteristic setting means includes;

selection means, having a plurality of mutually different brightness reduction characteristic curves representing a relationship between the brightness signal of said brightness control means and the brightness of said control panel lighting means, and responsive to a fifth external operation, for selecting one brightness reduction characteristic curve; and setting means, responsive to said selection means, for setting the brightness reduction characteristic of said control panel lighting means relative to the brightness signal of said brightness control means based on the maximum brightness set by said maximum brightness setting means, the minimum brightness set by said minimum brightness setting means and the brightness reduction characteristic curve selected by said selection means.

10. The apparatus as claimed in claim 9, wherein said fifth external operation is an operation of a fifth switch of said control panel.

11. The apparatus as claimed in claim 9, wherein said brightness reduction characteristic setting means, responsive to an operation of a sixth switch of said control panel, drives said selection means and said setting means.

12. The apparatus as claimed in claim 1, wherein said control panel brightness reduction characteristic setting means sets said brightness reduction characteristic based on a set minimum brightness and a set maximum brightness.

13. The apparatus as claimed in claim 1, wherein said control panel brightness reduction characteristic setting means includes selecting means for selecting a brightness reduction characteristic curve, said control panel brightness reduction characteristic setting means setting said brightness reduction characteristic based on said brightness reduction characteristic curve.

14. The apparatus as claimed in claim 1, wherein said control panel brightness reduction characteristic setting means includes mode decision means, responsive to a first external operation, for deciding whether a brightness reduction characteristic setting mode for setting the brightness reduction characteristic is requested.

15. The apparatus as claimed in claim 14, wherein said control panel brightness reduction characteristic setting means further includes light switch decision means, responsive to said mode decision means and a light switch information, for deciding whether a light switch is ON based on said light switch information when said brightness reduction characteristic setting mode is requested.

16. The apparatus as claimed in claim 15, wherein said control panel brightness reduction characteristic setting means further includes control means, responsive to said light switch decision means and a second external operation, for controlling the brightness of said control panel lighting means according to said second external operation when said light switch is ON.

17. A method for controlling lighting of a control panel comprising the steps of:

outputting a brightness signal in response to an operation of a dimmer knob;

controlling a luminosity of an instrument panel in accordance with the brightness signal;

setting, responsive to an external operation, a control panel brightness reduction characteristic relative to said brightness signal; and controlling a luminosity of the control panel in accordance with said brightness signal and said control panel brightness reduction characteristic.

18. The method according to claim 17, wherein said setting step includes setting said brightness reduction characteristic based on a set maximum brightness and a set minimum brightness.

19. The method according to claim 17, wherein said setting step includes selecting a brightness reduction characteristic curve and setting said brightness reduction characteristic based on said brightness reduction characteristic curve.

20. The method according to claim 17, wherein said setting step includes deciding, in response to a first external operation, whether a brightness reduction characteristic mode for setting said brightness reduction characteristic is requested.

21. The method according to claim 20, wherein said setting step further includes deciding whether a light switch is ON when said brightness reduction characteristic mode is requested.

22. The method according to claim 21, wherein said setting step further includes controlling the brightness of the control panel according to a second external signal when said light switch is ON.

23. The method according to claim 22, wherein said setting step further includes:

setting a maximum brightness corresponding to the request for a maximum brightness to an optional luminosity controlled by said controlling step according to a third external operation;

setting a minimum brightness corresponding to the request for a minimum brightness to an optional luminosity controlled by said controlling step according to a fourth external operation; and setting said brightness reduction characteristic based on said maximum brightness and said minimum brightness.

* * * * *